(12) United States Patent
Shua et al.

(10) Patent No.: US 12,526,301 B2
(45) Date of Patent: Jan. 13, 2026

(54) SYSTEMS AND METHODS OF GENERATING AUTOMATIC SUGGESTIONS TO CHANGE INFRASTRUCTURE AS CODE TO REMEDIATE CLOUD SECURITY ISSUES

(71) Applicant: Orca Security Ltd., Tel Aviv-Jaffa (IL)

(72) Inventors: Avi Shua, Tel Aviv-Jaffa (IL); Yoav Alon, Tel Aviv-Jaffa (IL); Lior Drihem, Tel Aviv-Jaffa (IL)

(73) Assignee: ORCA SECURITY LTD., Tel Aviv-Jaffa (IL)

( * ) Notice: Subject to any disclaimer, the term of this patent is extended or adjusted under 35 U.S.C. 154(b) by 134 days.

(21) Appl. No.: 18/601,507

(22) Filed: Mar. 11, 2024

(65) Prior Publication Data

US 2024/0314154 A1    Sep. 19, 2024

Related U.S. Application Data

(60) Provisional application No. 63/490,585, filed on Mar. 16, 2023.

(51) Int. Cl.
*H04L 29/06* (2006.01)
*H04L 9/40* (2022.01)

(52) U.S. Cl.
CPC ................................. *H04L 63/1425* (2013.01)

(58) Field of Classification Search
CPC .................................................... H04L 63/1425
See application file for complete search history.

(56) References Cited

U.S. PATENT DOCUMENTS

| | | | |
|---|---|---|---|
| 2020/0012480 A1* | 1/2020 | Rizo | G06F 21/577 |
| 2021/0203731 A1* | 7/2021 | Garty | H04L 67/51 |
| 2023/0044491 A1* | 2/2023 | Hussain | H04L 41/5048 |
| 2023/0164174 A1* | 5/2023 | Heller | H04L 63/0823 |
| | | | 726/23 |
| 2024/0220304 A1* | 7/2024 | Boyer | H04L 63/1425 |

OTHER PUBLICATIONS

Chinamanagonda, Sandeep. "Automating infrastructure with infrastructure as code (iac)." Available at SSRN 4986767 (2019). (Year: 2019).*

* cited by examiner

*Primary Examiner* — Ka Shan Choy
(74) *Attorney, Agent, or Firm* — Finnegan, Henderson, Farabow, Garrett & Dunner LLP (57) ABSTRACT

Embodiments of the present disclosure include a non-transitory computer readable medium that when executed by at least one processor cause the at least one processor to generate automatic suggestions for changes to infrastructure as code (IaC) to remediate cloud security issues, the operations comprising: scanning at least one cloud account; generating an inventory of cloud assets based on the scanning of the at least one cloud account; scanning at least one repository of source files of an infrastructure as code (IaC) associated with the at least one cloud account; creating an inventory of IaC assets; matching each asset of the inventory of cloud assets with one or more assets of the inventory of IaC assets; identifying a vulnerability in at least one asset of the inventory of cloud assets; determining at least one asset of the inventory of IaC assets associated with the at least one asset of the inventory of cloud assets based on the matching; and generating at least one alert.

18 Claims, 3 Drawing Sheets

SYSTEMS AND METHODS OF GENERATING AUTOMATIC SUGGESTIONS TO CHANGE INFRASTRUCTURE AS CODE TO REMEDIATE CLOUD SECURITY ISSUES

CROSS-REFERENCE TO RELATED APPLICATIONS

This application claims the benefit of priority to U.S. Provisional Application No. 63/490,585, filed Mar. 16, 2023, the contents of which is incorporated herein by reference in its entirety.

TECHNICAL FIELD

The present disclosure, in some embodiments thereof, relates to new systems and methods for securing cloud infrastructure to help meet compliance mandates without disrupting business operations in live environments.

BACKGROUND

The cloud, or cloud computing, refers to servers that are accessed over the Internet and the software and databases that run on said servers. By using cloud computing, users and companies do not have to manage physical servers themselves or run software applications on their own machines. The cloud enables users to access the same files and applications from almost any device, because the computing and storage takes place on servers in a data center instead of locally on the user device.

Infrastructure as Code (IaC) is the managing and provisioning (e.g., setting up information technology infrastructure) of computer data centers through machine-readable definition files rather than via physical hardware configuration or interactive configuration tools. For example, in cloud computing, infrastructure as code (IaC) may be a method, process, or means for managing (e.g., organizing, maintaining, scanning) infrastructure using configuration files or other means of storing and running code. Servers, operating systems, storage, and other infrastructure components can be managed (e.g., organized, maintained, scanned) using the configuration files.

Traditional cloud security solutions may generate alerts regarding security issues such as misconfigurations, vulnerabilities, malwares, anomalies, and other irregularities in a cloud account, cloud workload, or other cloud system. In many traditional cloud security solutions, the generated alerts may be numerous and non-actionable, leading to alert fatigue in customers or any other entity that may receive the generated alert. Thus, in some solutions, manual remediation steps or automatic remediation steps may be generated and selected. However, these manual and automatic remediation steps may change configurations (or configuration files) via cloud provider application programming interfaces (APIs) without applying these changes to the IaC source code. This may generate drifts (e.g., IaC drift) from the IaC configuration or source code and the changes may be overridden in subsequent IaC deployments, rendering the cloud account, cloud workload, or other cloud system vulnerable again. There is a need to apply the manual and automatic remediation steps and changes to Infrastructure as Code (IaC) source code.

The disclosed platforms and/or techniques to generate automatic suggestions to change Infrastructure as Code (IaC) for remediating cloud security issues are directed to overcoming one or more of the shortcomings mentioned above and/or shortcomings in the art.

SUMMARY

Embodiments consistent with the present disclosure provide systems, methods, and computer readable media generally related to cloud infrastructure. The disclosed systems and methods may be implemented using a combination of conventional hardware and software as well as specialized hardware and software, such as machines constructed and/or programmed specifically for performing functions associated with the disclosed method steps. Consistent with other disclosed embodiments, non-transitory computer readable storage media may store program instructions, which may be executed by at least one processing device and perform any of the steps and/or methods described herein.

Embodiments of the present disclosure include systems and methods for generating automatic suggestions for changes to infrastructure as code (IaC) to remediate cloud security issues. Disclosed embodiments include scanning at least one cloud account. Embodiments may involve generating an inventory of cloud assets based on the scanning of the at least one cloud account. The inventory of cloud assets may include assets of the at least one cloud account. At least one repository of source files of an infrastructure as code (IaC) associated with the at least one cloud account may be scanned. An inventory of IaC assets may be created. The inventory of IaC assets may include assets managed by the infrastructure as code (IaC). Some embodiments may involve matching each asset of the inventory of cloud assets with one or more assets of the inventory of IaC assets. At least one asset of the inventory of IaC assets associated with the at least one asset of the inventory of cloud assets may be determined based on the matching. Embodiments may involve generating at least one alert. The at least one alert may include one or more of information associated with the vulnerability, a remediation suggestion, an activatable remediation control, and a pull request.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. For example, with this detailed description provides a few examples, these implementations are provided as examples only and are not restrictive of the claim concepts that follow or any of the descriptions herein. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, it is to be understood that the present disclosure may be practiced without one or more of these details.

It is intended that one or more aspects of any mechanism may be combined with one or more aspects of any other mechanisms, and such combinations are within the scope of this disclosure.

Aspects of this disclosure may provide technical solutions to challenges associated with cloud cybersecurity. Disclosed embodiments include methods, systems, devices, and computer-readable media. For ease of discussion, a system is described below with the understanding that the disclosed details may equally apply to methods, devices, and computer-readable media.

Embodiments of the present disclosure may include technology referred to as "SideScanning," as discussed in at least U.S. Pat. No. 11,489,863, filed on Apr. 8, 2022, titled FOUNDATION OF SIDESCANNING. This technology may also be referred to as "side-scanning," "side scanning," or "sidescanning." This technology may be a type of agentless scanning. Agentless technology, such as SideScanning, may scan file systems of workloads to assess security risks.

Embodiments of the present disclosure may include technology referred to as "agents." Agents may be a piece of software, or a software package, deployed to protect workloads. Agents may require separate installation for each workload and may provide real time detection of malicious activity as it occurs.

Embodiments of the present disclosure may provide a novel method for generating automatic suggestions to change Infrastructure as Code (IaC) to remediate cloud security issues. Embodiments of the present disclosure may reduce processing costs, increase processing speed, and provide a more reactive (or sensitive) cybersecurity system.

The real-time detection, prevention, and remediation may be provided by a cloud workload protection platform (CWPP). A CWPP may be implemented in a cloud account that is managed, or organized, using Infrastructure as Code (IaC). Furthermore, a CWPP may be configured to implement a process of keeping workloads that move across different cloud environments secure. It may continuously monitor for, and remove, threats from cloud workloads and containers. A workload may be an application, service, capability, or a specified amount of work that consumes cloud-based resources (e.g., computing or memory power). Examples of a workload may include databases, containers, microservices, virtual machines (VMs), and Hadoop nodes.

Additionally, or alternatively, automatic and continuous identification and remediation of misconfiguration issues and compliance risks may be provided by cloud security posture management (CSPM). CSPM may be implemented across diverse infrastructure, such as infrastructure as a service (IaaS), software as a service (SaaS), and platform as a service (PaaS). It may continuously detect and/or automatically remediate cloud misconfigurations; maintain an inventory of best practices for different cloud configurations and services; map current configuration statuses to a security control framework or regulatory standard; work with IaaS, SaaS, and PaaS platforms in containerized, hybrid cloud, and multi-cloud environments; and monitor storage buckets, encryption, and account permissions for misconfigurations and compliance risks. CSPM may secure cloud environments by reducing the possibility of data breaches.

As an example of a novel method for automatic remediation by changing IaC source code, various IaC tools (e.g., automations, packages) may be used to fulfill infrastructure automation and contribute to the creation of an IaC in, for example, a cloud account. These IaC tools may be software programs or other code modules created by an owner. A customer may implement at least one IaC tool to manage or organize their cloud account (e.g., cloud assets) using IaC, and the at least one tool may be created by at least one owner. By implementing, or using, IaC, the customer may provision and manage their servers, operating systems, storage, and other infrastructure components. The cloud account, cloud workload, or other cloud system of the customer may be scanned and misconfigurations (e.g., glitches, gaps, or errors that may expose a database server to risk, for example, data breaches, during cloud adoption) may be found. In response to the found misconfiguration, an alert may be generated that allows the customer to trigger a pull request. The customer may trigger the pull request. In some embodiments, attribution capabilities may be included, where the attribution capabilities may assign the pull requests to the relevant owner. The pull request may then be reviewed by the relevant owner of an IaC source code module associated with the pull request or the IaC source code. The relevant owner may approve the pull request and deploy the changes to the IaC code repository, remediating the misconfiguration, or other security vulnerability, at the source (e.g., the IaC source code).

For example, a cloud account may be scanned using control application programming interfaces (APIs) and side-scanning. An inventory of cloud assets may be generated, or created, by the scanning. Furthermore, in some embodiments, an alert may be generated in response to identified misconfigurations, vulnerabilities, malwares, anomalies, or other security issues identified in the cloud account.

Continuing the example, a repository of source files of an IaC, such as a git repository, may be scanned and an inventory of IaC assets may be generated, or created. In some embodiments, a git repository containing IaC source files belonging to the customer may be scanned. Furthermore, in some embodiments, an IaC tool that saves a state file may also be scanned.

Additionally, or alternatively, owners of each IaC tool or of each code module, source file, or code file within an IaC tool may be identified. In some embodiments, an attribution may be added by fetching relevant owners, or code owners, based on git blame capabilities.

Each asset of the inventory of cloud assets may be matched to an asset of the inventory of IaC assets. A reference may be generated based on the matches such that each asset of the inventory of cloud assets includes a reference to an IaC tool code module, source file, or code file that is responsible for each asset of the inventory of cloud assets. Furthermore, in some embodiments, a reference to the code owner(s) of each referenced IaC code module, source file, or code file may be included.

Thus, the generated alert may reference the IaC tool code module, source file, or code file and any relevant code owner(s). A remedy to the IaC code may be generated or suggested. In some embodiments, the generated or suggested remedy may include a change to the code in the IaC tool. Furthermore, in some embodiments, an activatable remediation control (e.g., remediation button) may be included with the generated alert. Additionally, or alternatively, in some embodiments, a pull request may be generated and the pull request may include the code changes required or suggested to remedy the IaC code. In some embodiments, the pull request may be automated. The pull request may be assigned to the code owner(s) discussed above for review. In some embodiments, the assignment for review may be based on the attribution discussed above.

Figure 1:
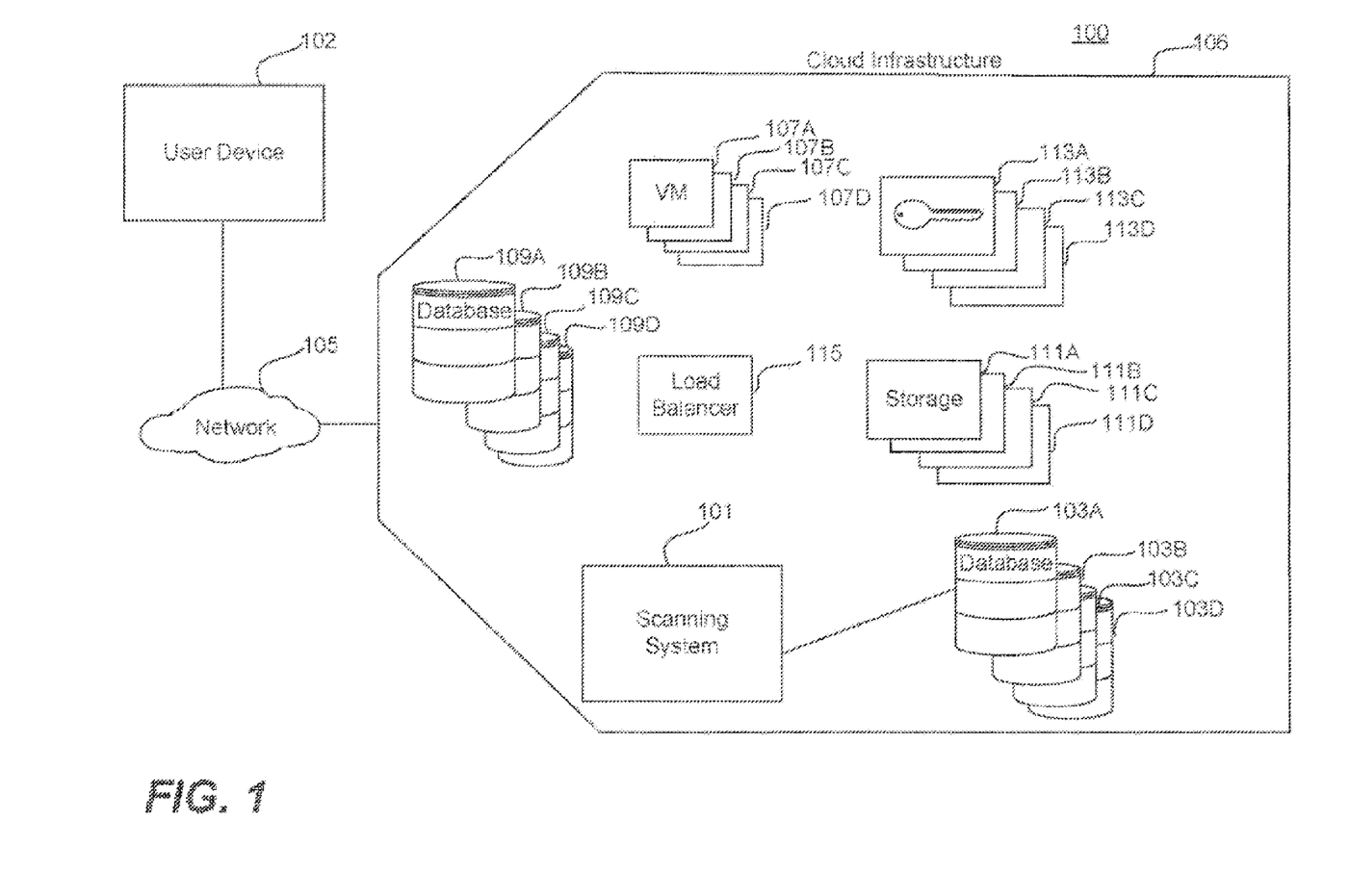
FIG. 1 is a schematic block diagram illustrating a network including computerized systems, consistent with disclosed embodiments.

FIG. 1 is a schematic block diagram 100 illustrating an exemplary embodiment of a network including computerized systems, consistent with the disclosed embodiments. Diagram 100 includes user device 102, network 105, and cloud infrastructure 106.

Cloud infrastructure 106 includes scanning system 101, databases 103A-103D, virtual machines 107A-107D, databases 109A-109D, storage 111A-111D, keystores 113A-113D, and load balancer 115. In some embodiments, cloud infrastructure 106 may be managed or organized by Infrastructure as Code (IaC), and the IaC may be achieved by implementation of at least one IaC tool. For example, the implementation of IaC may organize scanning system 101, databases 103A-103D, virtual machines 107A-107D, databases 109A-109D, storage 111A-111D, keystores 113A-113D, and load balancer 115 within, for example, a cloud network, into designated locations.

While particular numbers and arrangements of devices, systems, and connections, are depicted in exemplary FIG. 1, in some embodiments, each of the devices, systems, or connections may be omitted, duplicated, or modified. For example, in some embodiments, databases 109A-109D may exist as only a single database; in other embodiments, cloud infrastructure 106 may exist as one or more distinct or combined infrastructures (e.g., operated by the same or different cloud services). In some embodiments, scanning system 101 and/or databases 103A-103D may be part of cloud infrastructure 106 (and may be connected to the various other systems and devices in cloud infrastructure 106); in other embodiments, scanning system 101 and/or databases 103A-103D may be separate from cloud infrastructure 106 (e.g., connected to the systems and devices in cloud infrastructure 106 through network 105).

Scanning system 101, in some embodiments, may include one or more computer systems. Each of the one or more computer systems may include memory storing instructions and at least one CPU configured to execute those instructions to perform operations as discussed herein. In some embodiments, the instructions cause the CPU to perform scanning operations. In some embodiments, scanning system 101 may perform a scanning operation on one or more workloads (e.g., systems, devices, resources, etc.) in cloud infrastructure 106.

User device 102, in some embodiments, may include a mechanism operated by a user to control scanning system 101. For example, in some embodiments, user device 102 may be any of a personal computer, a server, a thin client, a tablet, a personal digital assistant, a smartphone, a kiosk, or any other mechanism enabling data input. User device 102 may be operated to instantiate functionality, access data, or otherwise interact with scanning system 101 via network 105, as described herein.

Databases 103A-103D include data stores for use by scanning system 101. In some embodiments, one or more of databases 103A-103D may be implemented as a NoSQL database, a relational database, a cloud database, a columnar database, a wide column database, a key-value database, an object-oriented database, a hierarchical database, or any other kind of database. In some embodiments, one or more of databases 103A-103D may be implemented as flat file stores, data stores, or other non-database storage systems. In some embodiments, databases 103A-103D may be implemented using one or more of ElasticCache, ElasticSearch, DocumentDb, DynamoDB, Neptune, RDS, Aurora, Redshift clusters, Kafka clusters, or EC2 instances.

Network 105 may be implemented as one or more interconnected data networks. For example, network 105 may include one or more of any type of network (including infrastructure) that provides communications, exchanges information, and/or facilitates the exchange of information, such as the Internet, a Local Area Network, a near field communication (NFC) network, or other suitable connection(s) that enables the sending and receiving of information between the components of system 100. Network 105 may be implemented using wireless connections, wired connections, or both. In some embodiments, one or more components of system 100 can communicate through network 105. In some embodiments, one or more components of system 100 may communicate directly through one or more dedicated communication links. While particular devices and systems are shown as connected to network 105, in some embodiments, more or fewer devices and systems may be connected to network 105.

Cloud infrastructure 106 may be implemented as a set of devices and systems offered by a single cloud service provider. For example, cloud infrastructure 106 may comprise devices and systems that are part of Amazon Web Services, Microsoft Azure, Google Cloud Platform, IBM Cloud, Alibaba Cloud, or any other cloud platform provider. In some embodiments, one or more of the devices and systems in cloud infrastructure may require authentication or other identity validation for access. For example, to access virtual machine 107A, a user may be required to enter a password or provide a key. Systems (e.g., scanning system 101 or user device 102) may administer or interact with cloud infrastructure 106 using a cloud service provider's system (not pictured).

Virtual machines 107A-107D may include one or more devices and systems that implement a virtualized/emulated version of a computer. A virtual machine may be implemented as an emulated version of a computer-including an operating system, memory, storage, graphics processing-such that it can be indistinguishable from a standard (non-virtual) machine to a running program. A computer system, referred to as a "host," may operate virtual machines 107A-107D, referred to as "guests," by dividing the resources of the host between the virtual machines such that each virtual machine is isolated from one another. This means that in some embodiments, one virtual machine, and the operating system(s) and application(s) running thereon, is only able to access the resources that are allocated to that virtual machine and cannot access resources allocated to other virtual machines. For example, if a host has 32 gigabytes of random access memory (RAM), and is hosting three virtual machines, the host may segment 8 gigabytes of RAM to each virtual machine such that each virtual machine may only access data in that 8 gigabytes of RAM and not any of the other 24 gigabytes. Examples of commercial virtual machine software and services include VMWare Workstation, VMWare Server, VMWare ESXi, VirtualBox, Parallels Desktop, Parallels RAS, Amazon Machine Image, Amazon ECS, Kubernetes, Microsoft Hyper-V, and Xen.

Databases 109A-109D may include data stores for use by devices and systems in cloud infrastructure 106. In some embodiments, one or more of databases 109A-109D may be implemented as a NoSQL database, a relational database, a cloud database, a columnar database, a wide column database, a key-value database, an object-oriented database, a hierarchical database, or any other kind of database. In some embodiments, one or more of databases 109A-109D may be implemented as flat file stores, data stores, or other non-database storage systems. In some embodiments, databases 109A-109D may be implemented using one or more of ElasticCache, ElasticSearch, DocumentDb, DynamoDB, Neptune, RDS, Aurora, Redshift clusters, Kafka clusters, or EC2 instances. Databases 109A-109D may store data usable by devices or systems in cloud infrastructure 106. The data, in some embodiments, may include e-commerce data (e.g., shipments, orders, inventory), media data (e.g., pictures, movies, streaming data), financial data (e.g., banking data, investment data), or other data.

Storage 111A-111D may include storage systems for use by devices and systems in cloud infrastructure 106. In some embodiments, one or more of storage 111A-111D may be implemented as a hard drive, a RAID array, flash memory, optical storage, or any other kind of storage. Each of 111A-111D may include one or more filesystems (e.g., Amazon Elastic File System, GlusterFS, Google File System, Hadoop Distributed File System, OpenZFS, S3, Elastic Block Storage).

In some embodiments, systems and devices of cloud infrastructure 106 may use databases 109A-109D to store data that is accessed frequently (where, for example, access is required within a few milliseconds), and may use storage 111A-111D to store data that is accessed less frequently (where, for example, access is required within a few minutes or hours).

Keystores 113A-113D may include systems storing keys for accessing data and functionality. For example, to access certain data or systems, a system may require the use of passwords or keys in keystores 113A-113D for authentication. The data and functionality that the keys grant access to may be part of cloud infrastructure 106 or may be separate from cloud infrastructure 106. For example, keystores 113A-113D may include systems that store public and private keys (e.g., for use via SSH), may store passwords (e.g., login information for websites or programs), may store tokens (e.g., one-time passcodes), or the like. In some embodiments, keystores 113A-113D may be implemented as one or more of Amazon Web Services KMS, Azure Key Vault, or Google KMS.

Load balancer 115 may include one or more systems that balance incoming requests between the different systems and devices of cloud infrastructure 106. For example, load balancer 115 may be configured to determine usage (e.g., processor load, used storage capacity) of systems or devices in cloud infrastructure 106 to assist in determining where to route an incoming request from network 105 to store data, perform processing, or retrieve data.

Load balancer 115 may be configured to receive an incoming request from user device 102. Upon receipt of the request, load balancer 115 may consult a data store (part of or separate from load balancer 115; not pictured) to determine usage or forecasted usage of various systems or devices in cloud infrastructure 106 and may forward the request to the systems or devices having the lowest usage or forecasted usage.

Figure 2:
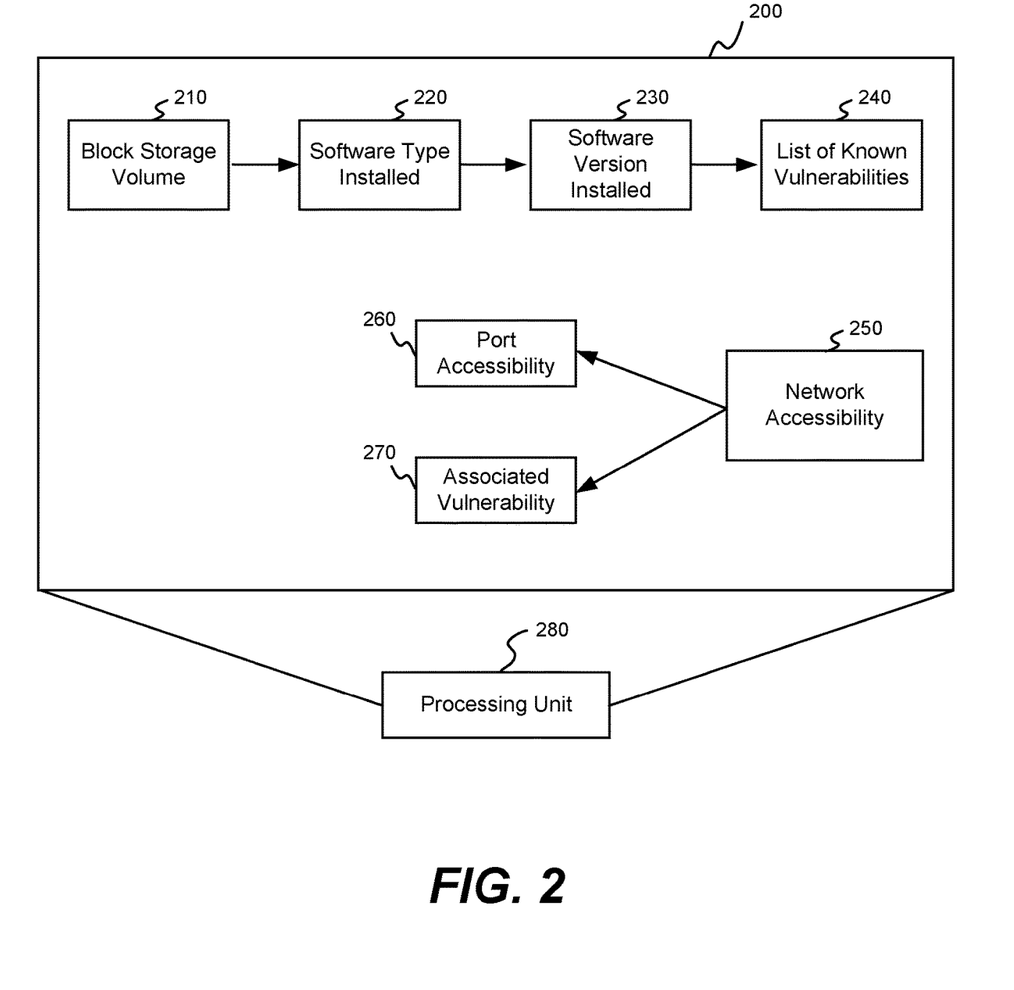
FIG. 2 is a schematic block diagram describing a method of operating a cybersecurity system performing side scanning function, or agentless scanning, to protect against potential vulnerabilities, consistent with disclosed embodiments.

FIG. 2 of the disclosed embodiments describes a system of operating a cybersecurity system performing agentless scanning, or a side scanning (SideScanning) function, to protect against potential vulnerabilities. A processor unit 280 may be configured to perform the method. When initiated either manually or automatically, processor unit 280 may be communicatively connected with a cloud provider API 200 to initiate a cybersecurity function as disclosed above. Contained digitally on a memory device and accessed by a cloud provider API 200 is a series of block storage volumes 210. Processor unit 280 may be capable of performing a vertical and horizontal scan for network access or security information of a block storage volume 210 to detect potential vulnerabilities to the block storage volume 210 or any processing unit 280 designed to access said block storage volume 210.

Based on the accessed block storage volume 210, processor unit 280, with the disclosed embodiments of a cybersecurity system, may perform an identification of the type of software installed 220 connected with block storage volume 210. Following identification of the type of software installed 220, the processing unit may then identify an installed version 230 of said installed software 220 for a version comprised of a unique identifier based on a combination of letters, numbers, or similar unique identifiers.

Upon recognition of an installed software version 230 of the installed software 220, processing unit 280, with some embodiments of the disclosed scanning system 101, may provide a list of known vulnerabilities 240 for review by said scanning system 101 and/or its end user and maintainer of said block storage volumes 210. Based on the list of known vulnerabilities 240, the disclosed scanning system 101 or its end user may identify one or more ports of accessibility to said block storage volume 210 that may be accessed by a known, associated vulnerability 270 from listed vulnerabilities 240 to determine an avenue for potential vulnerability 270 to access and infiltrate block storage volume 210.

In some embodiments, a cyber security scanning system for a cloud environment 101 may include a processor 280 to operate said system. This processor 280 may include central processing units and other similar computer-enabling equipment for processing and executing commands based on the information inputted to said system. The processor 280 may be communicatively connected to a computer network or series of networks to accomplish said cyber security function.

As an example embodiment, a processor unit 280 may be configured to use a cloud-provider API that may communicate with one or more specified computer-readable media across a digital network. This can be accomplished through internet protocols, internet control message protocols, transmission control protocol, or user datagram protocol. Cloud provider API 200 may be one of several forms of middleware, interface, middle layer, or other systems of interfacing applications. A processor 280 may be one or more computer processing units, central processing unit, server, microcomputer, mainframe, and any other manifestation of digital computing.

Further to one of several possible embodiments, a cloud-provider API 200 may be configured to access a block-storage volume 210 of a workload maintained in a cloud-storage environment. This may be accomplished through a system of computer-readable media communicatively connected. Said block-storage volume 210 may be contained on a Storage Area Network (SAN) or similar cloud-based memory storage environment. The block storage volume 210 may be contained in smaller storage volumes with an associated identifier unique to that portion of said block storage volume 210. In some embodiments, the block-storage volume 210 of a workload may have multiple paths for the storage volume to be reaggregated and retrieved quickly.

Among several embodiments, a scanning system 101 may comprise a system for identifying an installed software application in the accessed block-storage volume 210. This identification of installed software may be accomplished by accessing installed software 220 files through signature verification, root license, or authorized user lists. The installed software 220 may be located and identified within applications such as file storage, database storage, and virtual machine file system volumes. The identification of said installed software application 230 may be processed, analyzed, and communicated to the scanning system 101 for processing, cataloging, and protection through encryption and various methods of layered cyber defense.

Further, the scanning system 101 described herein may include functionality to analyze installed software applications to determine the associated software version. The software application version 230 may identify the software version based on unique version name, unique version number, and may be based on unique states of the currently installed computer software 220.

One of many embodiments disclosed above may include the scanning system 101 having the ability to access a data structure of known software vulnerabilities 240 for a plurality of versions of software applications. The known software vulnerabilities 240 may include, among others, missing data encryption, OS command injection, SQL injection, buffer overflow, missing authentication, missing authorization, unrestricted upload of dangerous file types, reliance on untrusted inputs in a security decision, cross-site scripting and forgery, download of codes without integrity checks, broken algorithms, URL redirection, path traversal, software bugs, weak passwords, and previously infected software. The scanning system 101 may be able to access and identify software vulnerabilities for mitigation, rectification, correction, and fortification.

In one embodiment, a cybersecurity system may also perform scanning according to scanning system 101 by performing a lookup of the identified installed software version 230 in the data structure to identify known vulnerabilities 240. This function can be performed by the scanning system 101 of FIG. 1 by performing a query of the installed software 220 for unique version number or designator and comparing to, amongst many things, a set of likely or potential vulnerabilities to that software version for potential deficiencies or cybersecurity threats known or suspected to similar software types and versions. This query may be performed according to a predetermined set of values, to include previously identified unique version numbers or designators that may contain the known list of previously identified vulnerabilities.

Among many embodiments, some embodiments of the disclosed scanning system 101 may query the cloud provider API 200 to determine network accessibility information 250 related to the workload. To accomplish this query of the cloud provider API 200, the scanning system 101 may involve an index of search results and display of said search results, followed by processing and grouping search results. Network accessibility information 250 may include connection quality, alternative paths between nodes in a network, and the ability to avoid blockage in said networks. The workloads associated with this query may include applications, services, capabilities, and specific processes such as virtual machines, databases, containers, or Hadoop nodes, among others.

If the system detects a vulnerable application 270, one embodiment may identify one or more ports on which said vulnerable application is accessible. In one of several embodiments, the scanning system 101 may detect a vulnerable application in one or more computation processes. In another embodiment, the cybersecurity system may perform a network accessibility query in a separate process. Further, a disclosed embodiment may perform these separate functions in subsequent and sequential steps of the same process. A person of ordinary skill in the art would understand that an authorized user or an authorized scanning system 101 can perform these functions concurrently and subsequently by an authorized user or an authorized cybersecurity system while performing the same function as the disclosed embodiment.

Upon gathering network accessibility information and the identified port to identify one or more vulnerabilities susceptible to attack from outside the workload, a disclosed embodiment would have the functionality to perform processes to gather, display, and mitigate a discovered vulnerability in order to minimize the likelihood and effectiveness of a cyber threat outside of and attempting to access a workload through a known or previously encountered type of cyber threat. This functionality may include collecting and organizing the vulnerabilities according to type or category of vulnerability, displaying the gathered data for an end user or maintainer, and implementing security features automatically or manually by a user or maintainer such as security patches, password or passcode changes and suggestions for users to do the same, and malicious code eradication.

As one of several possible embodiments, the scanning system 101 may also, upon identification of one or more vulnerabilities, implement remedial actions, or remediation, via one or more processors. Remedial actions may include, among other things, notification(s) to an end user of an identified threat, compensation through a revised security code to mitigate the potential threat, publication of the identified threat and vulnerability in a log or record of detected vulnerabilities, and communication of the sensed vulnerability and threat to a server operator or maintainer to fortify the protections of workloads existing on similar environments.

Additionally, or alternatively, the remedial measure may include transmission of an alert to a device associated with an administrator. The alert may be, amongst others, written, auditory, and visual for processing and use by an administrator of said scanning system 101. Said administrator may take action based on the received alert to eliminate the cyber threat through mitigation measures, change the cybersecurity posture, and/or remove the workload from the cybersecurity threat environment.

In another embodiment, a query of the cloud provider API 200 to determine network accessibility information related to the workload may be performed by at least one processor 280 configured to examine data sources associated with the workload. The data examined may include user data, system processing data, accessibility data, clock cycles, storage input/output, or similar data processors. A query of the cloud provider API 200 may be automated or manually initiated. Based on the said query, the network accessibility information 250 related to the workload may change based on the data sources associated with said workload.

In the above processor and similar embodiments, further configuration may include a process to determine network accessibility information 250 based on the examined data sources. The examined data sources may include various cloud-based workloads, internet protocols, transmission communication protocols, or other methods and systems of memory and data storage.

In some embodiments, network accessibility information 250 includes at least one of: data from an external data source, cloud provider information, or at least one network capture log. These embodiments of an external data source may include data from the operating environment of the cloud-based environment, an external operating system for a computer processing unit 280, or other similar computer readable media. Cloud provider information may further include information that may identify the network accessibility information 250 vertically or horizontally to fully describe the associated workload. Network capture logs may be automated or manually updated to include possible vulnerabilities 270 and threats to the cloud-based storage medium.

Further, the disclosed embodiments may include an installed software application 230, with the at least one processor 280 configured to extract data from at least one of operating system packages, libraries, or program language libraries. This data may be extracted through a system query, random access algorithm, or similar automated process. Operating system packages may include systems operable on Microsoft, Apple, Linux, and similar operating systems. Libraries may consist of a series of files, folders, and databases of information stored on one of any indexed data repositories. A program language library may contain several program languages including but not limited to Javascript, Swift, Scala, Go, Python, Elm, Ruby, C #, C++ and other similar sources of software code.

Furthermore, in some embodiments, a scanning system 101 may also include a processor 280, configured to identify installed software application 220 based on the extracted data. The processor 280 may perform only this function or this function among many to accomplish the layered cybersecurity defense described herein this disclosed cloud-based security environment. The identification of installed software by said processor may include identifying the software by unique version number or designator, recognized source code, metadata associated with the installed software application files, or similar software-identifying information.

One embodiment may include an additional function wherein the installed software application 220 that has been identified includes one or more scripts. These scripts may be processed through various computer readable languages to include Javascript, C #, C++, and other forms of computer code.

One embodiment contemplated by the disclosed scanning system 101 may also include data structure including aggregated vulnerability data 240. This aggregated vulnerability data 240 may be compiled by an end user or maintainer from within the cloud-based environment of the current data structure as well as compilation from similar data sets and aggregation of common threats to data structures likely to experience similar vulnerabilities. This aggregation of vulnerability data 240 may be contained within the data structure and it may be collectively aggregated to provide for a more robust and layered cybersecurity defense posture.

In some embodiments of the disclosed scanning system 101, the aggregated vulnerability data 240 may include data from one or more third-party vendors. These vendors may include operators of the cloud-based server environment, providers of networking and internet communication, methods of layered authentication, and other similar providers of services directly related and in communication with the cloud-based cybersecurity system.

As an additional exemplary embodiment, the aggregated vulnerability data 240 may include data collected by a scanner. This scanner may involve use of continuous or periodic monitoring of the workload. The scanner may perform security screenings of the various workloads vertically or horizontally to identify network identification information, port accessibility, and associated vulnerabilities. Any scan performed may be communicated to the scanning system 101 that may be responsible for performing and logging the results of the scan and may be able to initiate follow-on processes and protocols to protect the data contained in the workload that is the subject of scanning.

An embodiment of the disclosed scanning system 101 may also include aggregated vulnerability data 240 that may include at least one of an advisory, an exploit, a security announcement, or a known bug. An advisory may include notification to a system maintainer or user of the potential vulnerability, may log notice of the advisory, and may recommend possible user or maintainer actions to potentially address said advisory. An exploit may further include an automated system response designed to take advantage of the sensed vulnerability data. The exploit can be further reflected in the aggregated vulnerability data and protocols can be written into the cybersecurity infrastructure to prevent said exploit from gaining access and permissions to unauthorized areas of the workload storage environment.

A person having ordinary skill in the art would appreciate the above-described embodiments are among many potential embodiments, to include a method of operating a scanning system 101 similar to the one described above. Disclosed embodiments contemplate the disclosed methods to be accomplished through manual user operation, automated computer processes, or similar manners of operation. These manners of operation and those contemplated similar to them would allow embodiments of the scanning system 101 described and disclosed to execute its operations as the system above describes.

Figure 3:
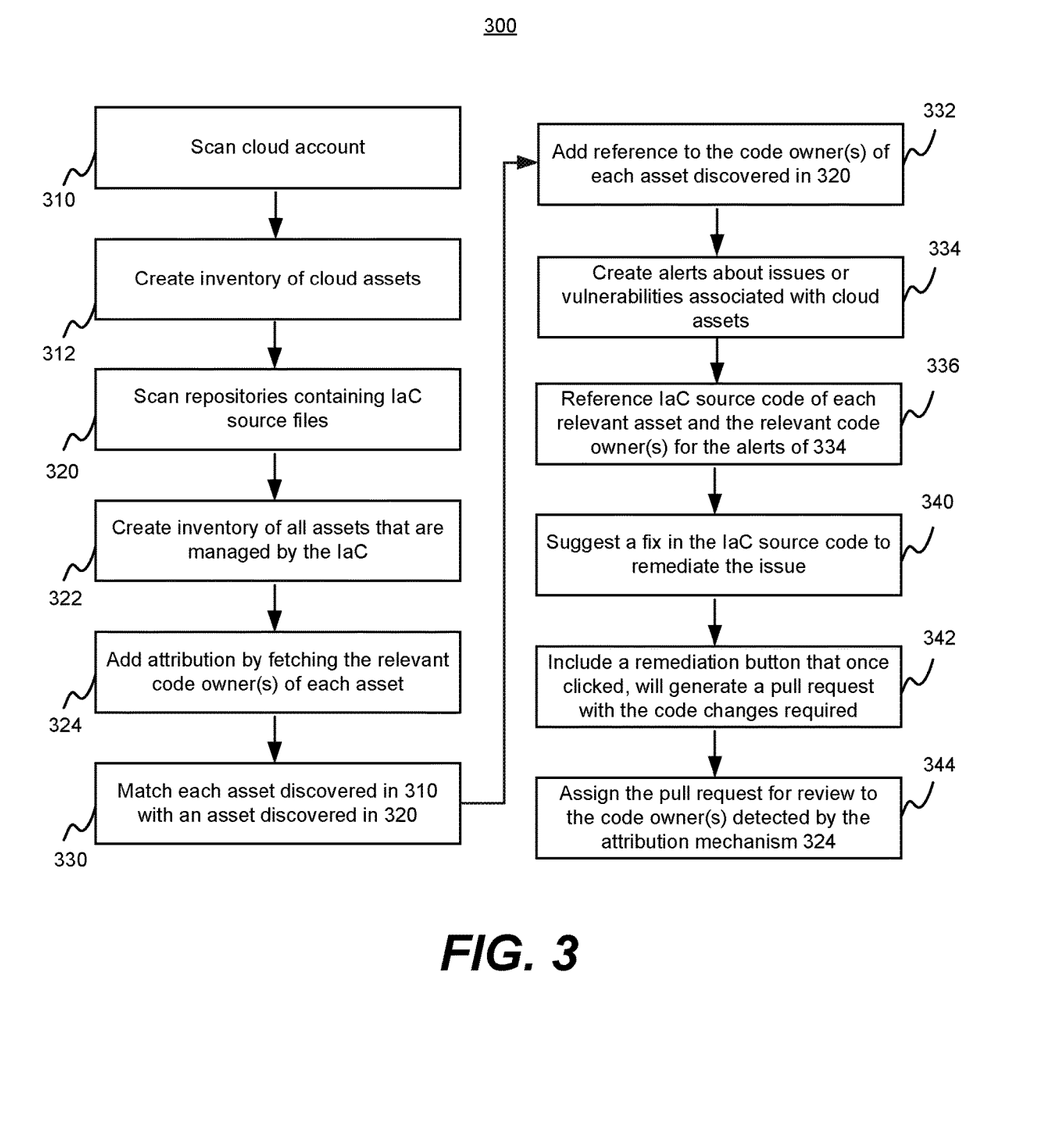
FIG. 3 is a schematic block diagram illustrating a process for generating automatic suggestions to change Infrastructure as Code (IaC) to remediate cloud security issues, consistent with disclosed embodiments.

FIG. 3 is a schematic block diagram illustrating a process 300 for generating automatic suggestions to change Infrastructure as Code (IaC) to remediate cloud security issues, consistent with disclosed embodiments. One of ordinary skill will appreciate that the steps in process 300 may be performed in any order, and may be duplicated, omitted, or modified, as appropriate.

The process 300 may include scanning a cloud account, as shown in step 310. The scanning may include scanning using at least one control application programming interface (API) and side scanning. As shown in step 312, an inventory of cloud assets may be created or generated.

The process may further include scanning repositories containing IaC source files, as shown in step 320. The scanning may be performed using version control systems (VCSs). As used herein, version control systems (VCSs) may pertain to software that may track modifications made to code or source files. An inventory of all assets that are managed by IaC may be created, as shown in step 322. The managing of assets may include the organizing of assets within the cloud infrastructure, scanning of assets to look for vulnerabilities, or any other manner of monitoring assets.

Furthermore, as shown in step 324, an attribution may be added to each asset of the inventory of assets created in step 322 by fetching the relevant code owner(s) of each asset. In some embodiments, the attribution may be determined and added by using a version control system (VCS) that may track and show modifications made to code, or a source file, and the author of each modification. Additionally, or alternatively, the attribution may be determined and added by reading a file that contains a list of the owners of each segment of code of, for example, a source file.

As shown in FIG. 3, step 330, each asset discovered and added to the inventory of cloud assets in steps 310, 312 may be matched with an asset discovered and added to the inventory of IaC assets in steps 320, 322. A reference to the code owner(s) of each asset discovered in 320 may also be added, as shown in step 332.

Furthermore, as shown in step 334, alerts about issues (e.g., misconfigurations, vulnerabilities, malwares, and anomalies) may be created or generated. A misconfiguration may include a glitch, gap, or any other error in software (e.g., code) that may expose, for example, a cloud account to risk (e.g., data breaches). A vulnerability may include missing data encryption, OS command injection, SQL injection, buffer overflow, missing authentication, missing authorization, previously infected software, or any other issue that may render a cloud account at risk of, for example, a data breach. Malware may include software that is specifically designed to disrupt, damage, or gain unauthorized access to a cloud account or assets within a cloud account. An anomaly may include suspicious or uncommon data that differs from the majority of the data within, for example, a cloud account.

In some embodiments, and as shown as step 336 of FIG. 3, for each alert in step 334, a reference to the IaC source code of each relevant asset and the relevant code owner(s) may be created, identified, or determined. Furthermore, as shown in step 340, a fix or solution may be suggested to remediate the issue. The fix or solution may include a change in the IaC source code. In some embodiments, the fix or solution may be suggested by using a list, such as a playbook, containing each issue type and remediation techniques for each issue type. Additionally, or alternatively, an autoregressive language model that uses deep learning (machine learning and artificial intelligence) may be used to generate a suggested fix or solution. The autoregressive language model may read the IaC code and suggest changes to relevant module properties to remediate the issue. For example, a Generative AI tool, such as OpenAI's GPT-3.5, may be used to suggest fixes and recommend remediations to the IaC code according to details from the alert.

In some embodiments, and as shown in step 342 of FIG. 3, a remediation button, or any other activatable remediation control, may be presented. Once the activatable remediation control is enabled, activated, clicked, or pressed, a pull request may be generated. The pull request, or merge request, may include code changes to the IaC source code. As used herein, a pull request may pertain to an event that takes place in software development when a contributor or developer begins the process of merging new code changes to a main project repository. The code changes included in the pull request may fix, resolve, or remedy the issue. The pull request may be assigned to the code owner(s) for review, as shown in step 344. In some embodiments, the code owner(s) may be determined by the attribution mechanism of step 324.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable medium may include any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

Memory employed herein may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for cloud cybersecurity, the computing device may include processing circuitry communicatively connected to a network interface and to a memory, wherein the memory contains instructions to be executed. The computing devices may be devices such as mobile devices, desktops, laptops, tablets, or any other devices capable of processing data. Such computing devices may include a display such as an LED display, augmented reality (AR), virtual reality (VR) display.

"Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

What is claimed is:

1. A non-transitory computer readable medium containing instructions that when executed by at least one processor cause the at least one processor to generate automatic suggestions for changes to infrastructure as code (IaC) to remediate cloud security issues, the operations comprising:
   scanning at least one cloud account;
   generating an inventory of cloud assets based on the scanning of the at least one cloud account, the inventory of cloud assets including assets of the at least one cloud account;
   scanning at least one repository of source files of an infrastructure as code (IaC) associated with the at least one cloud account;
   creating an inventory of IaC assets, the inventory of IaC assets including assets managed by the infrastructure as code (IaC);
   matching each asset of the inventory of cloud assets with one or more assets of the inventory of IaC assets;
   identifying a misconfiguration in at least one asset of the inventory of cloud assets;
   determining at least one asset of the inventory of IaC assets associated with the at least one asset of the inventory of cloud assets based on the matching; and
   generating at least one alert, the at least one alert including one or more of information associated with the misconfiguration, a remediation suggestion, an activatable remediation control, and a pull request.

2. The non-transitory computer readable medium of claim 1, the operations further comprising:
   determining at least one code module in the infrastructure as code (IaC) responsible for managing at least one asset of the inventory of IaC assets; and
   generating a remediation suggestion, the remediation suggestion including a change to code included in the determined at least one code module.

3. The non-transitory computer readable medium of claim 2, the operations further comprising:
   determining at least one code owner of the determined at least one code module; and
   sending the alert to the determined at least one code owner.

4. The non-transitory computer readable medium of claim 1, wherein the pull request is automatically generated.

5. The non-transitory computer readable medium of claim 3, wherein the determined at least one code owner of the determined at least one code module includes an attribution based on blame capabilities.

6. The non-transitory computer readable medium of claim 1, wherein the at least one repository of source files is a git repository.

7. A method for generating automatic suggestions for changes to infrastructure as code (IaC) to remediate cloud security issues, the method comprising:
   scanning at least one cloud account;
   generating an inventory of cloud assets based on the scanning of the at least one cloud account, the inventory of cloud assets including assets of the at least one cloud account;
   scanning at least one repository of source files of an infrastructure as code (IaC) associated with the at least one cloud account;
   creating an inventory of IaC assets, the inventory of IaC assets including assets managed by the infrastructure as code (IaC);
   matching each asset of the inventory of cloud assets with one or more assets of the inventory of IaC assets;
   identifying a misconfiguration in at least one asset of the inventory of cloud assets;
   determining at least one asset of the inventory of IaC assets associated with the at least one asset of the inventory of cloud assets based on the matching; and generating at least one alert, the at least one alert including one or more of information associated with the misconfiguration, a remediation suggestion, an activatable remediation control, and a pull request.

8. The method of claim 7, the method further comprising:
determining at least one code module in the infrastructure as code (IaC) responsible for managing at least one asset of the inventory of IaC assets; and
generating a remediation suggestion, the remediation suggestion including a change to code included in the determined at least one code module.

9. The method of claim 8, the method further comprising:
determining at least one code owner of the determined at least one code module; and
sending the alert to the determined at least one code owner.

10. The method of claim 7, wherein the pull request is automatically generated.

11. The method of claim 9, wherein the determined at least one code owner of the determined at least one code module includes an attribution based on blame capabilities.

12. The method of claim 7, wherein the at least one repository of source files is a git repository.

13. A system for generating automatic suggestions for changes to infrastructure as code (IaC) to remediate cloud security issues, the system comprising:
at least one processor configured to:
scan at least one cloud account;
generate an inventory of cloud assets based on the scanning of the at least one cloud account, the inventory of cloud assets including assets of the at least one cloud account;
scan at least one repository of source files of an infrastructure as code (IaC) associated with the at least one cloud account;
create an inventory of IaC assets, the inventory of IaC assets including assets managed by the infrastructure as code (IaC);
match each asset of the inventory of cloud assets with one or more assets of the inventory of IaC assets;
identify a misconfiguration in at least one asset of the inventory of cloud assets;
determine at least one asset of the inventory of IaC assets associated with the at least one asset of the inventory of cloud assets based on the matching; and
generate at least one alert, the at least one alert including one or more of information associated with the misconfiguration, a remediation suggestion, an activatable remediation control, and a pull request.

14. The system of claim 13, wherein the at least one processor is further configured to:
determine at least one code module in the infrastructure as code (IaC) responsible for managing at least one asset of the inventory of IaC assets; and
generate a remediation suggestion, the remediation suggestion including a change to code included in the determined at least one code module.

15. The system of claim 14, wherein the at least one processor is further configured to:
determine at least one code owner of the determined at least one code module; and
send the alert to the determined at least one code owner.

16. The system of claim 13, wherein the pull request is automatically generated.

17. The system of claim 15, wherein the determined at least one code owner of the determined at least one code module includes an attribution based on blame capabilities.

18. The system of claim 13, wherein the at least one repository of source files is a git repository.

* * * * *